(12) United States Patent
Galperin (10) Patent No.: US 8,090,829 B1
(45) Date of Patent: Jan. 3, 2012

(54) DETERMINING A BACKUP SERVER FOR A SESSION BASED ON A DETERMINISTIC MECHANISM AND THE SESSION'S KEY VALUE

(75) Inventor: Viatcheslav Galperin, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1368 days.

(21) Appl. No.: 10/831,250

(22) Filed: Apr. 23, 2004

(51) Int. Cl.
*G06F 15/173* (2006.01)

(52) U.S. Cl. .......................................................... 709/226

(58) Field of Classification Search .................. 709/226, 709/240
See application file for complete search history.

(56) References Cited

U.S. PATENT DOCUMENTS

| | | | |
|---|---|---|---|
| 6,539,494 B1 | 3/2003 | Abramson et al. | |
| 6,557,120 B1 * | 4/2003 | Nicholson et al. | 714/38 |
| 7,185,048 B2 * | 2/2007 | Arakawa et al. | 709/202 |
| 7,197,547 B1 * | 3/2007 | Miller et al. | 709/223 |
| 2003/0014526 A1 * | 1/2003 | Pullara et al. | 709/227 |
| 2003/0112977 A1 * | 6/2003 | Ray et al. | 380/270 |
| 2004/0010699 A1 * | 1/2004 | Shao et al. | 713/189 |
| 2004/0078467 A1 * | 4/2004 | Grosner et al. | 709/226 |
| 2005/0091217 A1 * | 4/2005 | Schlangen | 707/10 |
| 2005/0097329 A1 * | 5/2005 | Morimoto et al. | 713/176 |

OTHER PUBLICATIONS

Pierre L'Ecuyer, "Random Number Generation," http://www.iro.umontreal.ca/~lecuyer/myftp/papers/handstat.pdf, pp. 1-38.

* cited by examiner

*Primary Examiner* — Thu Nguyen
*Assistant Examiner* — Joseph Greene
(74) *Attorney, Agent, or Firm* — Osha • Liang LLP (57) ABSTRACT

A mechanism is disclosed for determining, based on a deterministic mechanism and a session's key value, a backup server for the session. In one embodiment, each session has a different key value, and each key value can be processed through the deterministic mechanism to give rise to a separate ordering of a result value set. Each server of a plurality of servers is associated with a different one of the set's values. A request pertaining to a particular session is received. The request indicates the particular session's key value. The deterministic mechanism can generate result values, in a particular order to which the session's key value gives rise, until a result value associated with a currently operational server is generated. The request is sent to that server if the request's primary server is not currently operational. A pseudo-random number generator seeded with the key value may generate the result values.

15 Claims, 5 Drawing Sheets

DETERMINING A BACKUP SERVER FOR A SESSION BASED ON A DETERMINISTIC MECHANISM AND THE SESSION'S KEY VALUE

BACKGROUND

The Internet is commonly used as a medium over which remote parties can conduct information transactions. For example, using a browser application on a computer, a shopper can select items to be purchased from a remote vendor. The shopper may virtually place the selected items into a virtual shopping cart. Each time that the shopper places an item into the virtual shopping cart, the shopper's browser may send, to the vendor's server, a request that indicates which item the shopper has selected. For each such request, the vendor's server may send, to the shopper's browser, a response that indicates that the selected item has been placed into the virtual shopping cart. The requests and responses may be structured, for example, according to the well-known Hypertext Transfer Protocol (HTTP).

Multiple shoppers might send requests to the same vendor. In order to keep the contents of the shoppers' virtual shopping carts separate, each shopper may be assigned to a separate "session." Each such session is associated with a different session identifier that is generated when the session is initiated. Requests indicate the session identifier of the session to which those requests pertain. For example, requests from a first shopper might indicate a session identifier of "1," while requests from a second shopper might indicate a session identifier of "2." Using the session identifiers, the vendor's server can internally maintain separate session state information for each separate shopper, thus keeping the second shopper from placing items into the first shopper's virtual shopping cart, and vice-versa.

In order to handle many requests concurrently, a particular vendor might have multiple servers that can receive requests. For example, all of the requests to a particular vendor might be received initially by the vendor's "load balancer," which distributes the requests among the vendor's servers. The load balancer might distribute the requests, for example, according to a random or "round robin" scheme.

Although session state information for multiple sessions can be stored in a central repository that each of the servers can access, it is not efficient for a server to access the central repository every time that the server needs to read session state information. To improve efficiency, each server may locally maintain separate session state information for sessions that have been assigned to that server. When a server receives a request that pertains to a pre-existing session for which the server has no local session state information, the server sends the request to a different server. According to one hypothetical approach, each request might indicate a "primary server" to which the request should be sent. All of a particular session's requests might indicate the same primary server.

Occasionally, a server may fail. When a server fails, the requests that normally would have been sent to the failed server need to be sent to one or more of the servers that remain operational. The servers to which such requests are to be sent are called "backup servers." When a particular session's primary server fails, all requests pertaining to the particular session should be sent to the same backup server so that the integrity of the particular session's state information is maintained.

Theoretically, if a server that receives a request (the "recipient server") detects that the request's primary server is not currently operational, the recipient server might query each of the other operational servers in order to determine if any of the other operational servers has assumed the role of backup server for the session to which the request pertains. If the recipient server determines that one of the other operational servers has assumed the role of backup server for the session to which the request pertains, then the recipient server might send the request to the backup server. Alternatively, if the recipient server determines that none of the other operational servers has assumed the role of backup server for the session to which the request pertains, then the recipient server might assume the role of backup server. In this manner, it could be assured that no more than one operational server has assumed the role of backup server for the same session.

The above approach might be feasible if very few servers are available to assume the role of backup server for a particular session. However, if there are many servers, the time and bandwidth consumed by the many queries required by the above approach would be prohibitive.

SUMMARY

In accordance with one embodiment of the present invention, a mechanism is disclosed for determining, based on a deterministic mechanism and a session's key value, a backup server for a session. In one embodiment, each session has a different key value, and each key value may be processed through the deterministic mechanism to gives rise to a separate ordering of a set of result values. Each server of a plurality of servers is associated with a different one of the result values in the set of result values.

A request pertaining to a particular session is received. The request indicates a key value that is associated with the particular session. To determine a backup server, the deterministic mechanism uses the key value to generate a result value. This result value is associated with a server, and a determination is made as to whether that server is currently operational. If so, then that server becomes the backup server for the session. If that server is not currently operational, then the deterministic mechanism generates another result value. This value is associated with another server, and a determination is made as to whether that server is currently operational. If so, it becomes the backup server. If not, the above process is repeated. This continues until an operational server is determined. The request is then sent to the backup server.

In one embodiment, the deterministic mechanism generates result values in an order that is derived from a session's key value. The ordering derived from a particular session's key value expresses the order in which servers should be designated as the backup server for the particular session if both the primary server and the preceding backup servers for the particular session have failed. A pseudo-random number generator seeded with the key value may generate the result values, for example.

Because servers can generate the result values using the key value, the result values do not need to be indicated in any of the requests. Because the pseudo-random number generator generates the result values in the same order when seeded with a particular key value, every server that receives a request that indicates the particular key value reaches the same conclusion about which server is the backup server for the session associated with the key value. This ensures that the integrity of the session state information is maintained.

DETAILED DESCRIPTION OF EMBODIMENT(S)

Overview

Figure 1:
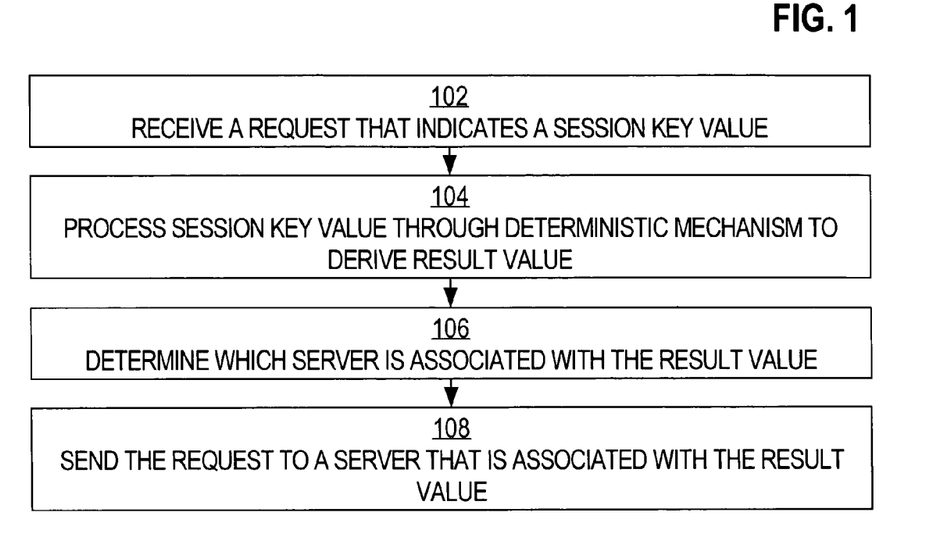
FIG. 1 depicts an overview of an operational flow for determining, based on a deterministic mechanism and a session's key value, a backup server for the session, in accordance with one embodiment of the present invention.

FIG. 1 depicts an overview of an operational flow for determining, based on a deterministic mechanism and a session's key value, a backup server for the session, in accordance with one embodiment of the present invention. In block 102, a request is received. The request indicates a session key value. The session key value can be processed through a deterministic mechanism to give rise to a particular ordering of a set of result values. In block 104, the session key value is processed through the deterministic mechanism to derive a particular result value. The particular result value is the next value in the particular ordering of the set of result values. In block 106, it is determined which server of a plurality of servers is associated with the particular result value. In block 108, the request is sent to a server that is associated with the particular result value.

Sample Implementation

Figure 2:
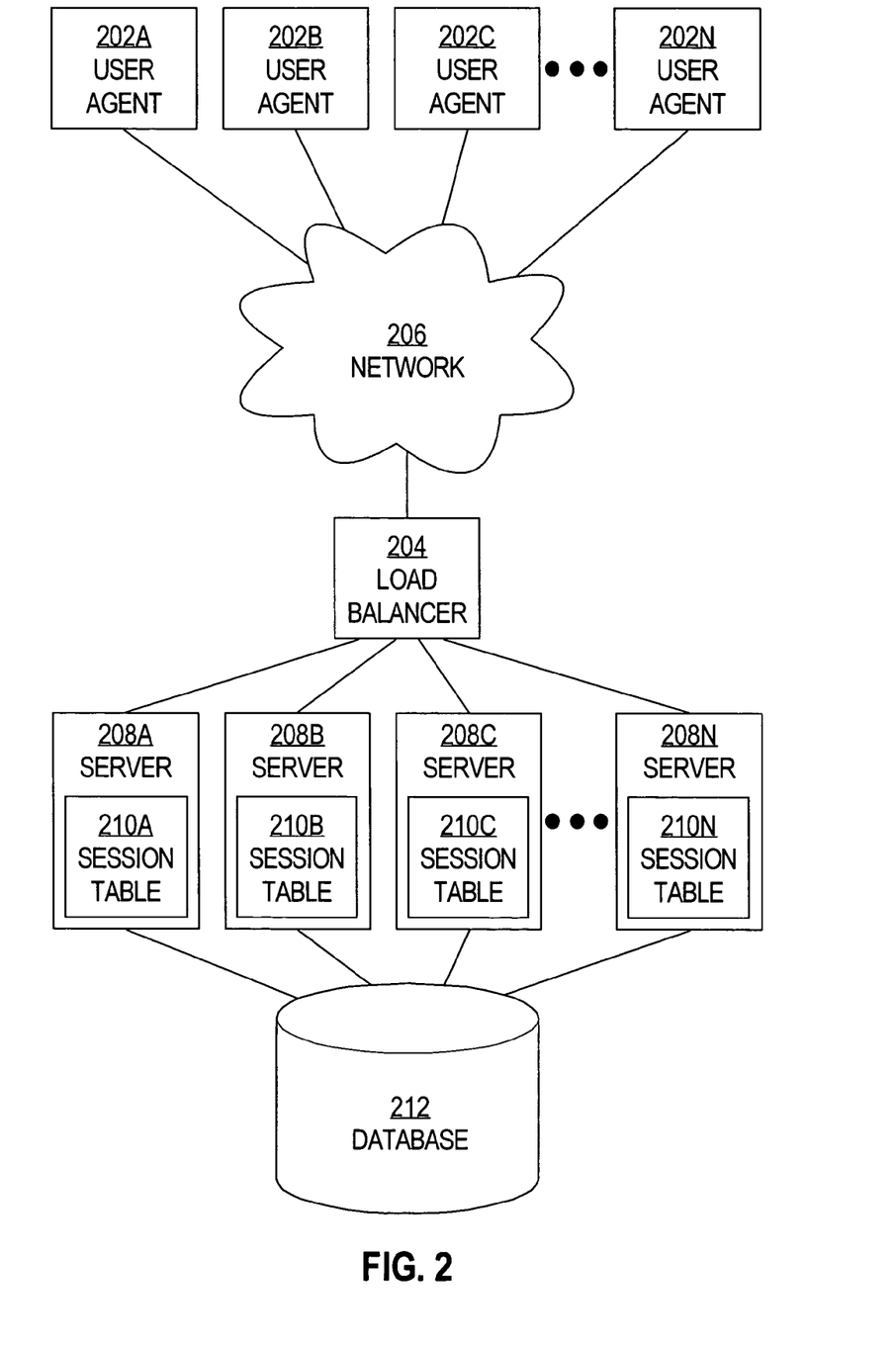
FIG. 2 is a functional block diagram of a system in which one embodiment of the present invention may be implemented.

FIG. 2 is a functional block diagram of a system in which one embodiment of the present invention may be implemented. In the system, user agents 202A-N and a load balancer 204 are communicatively coupled to a network 206. Each of user agents 202A-N may be a separate Internet browser executing on a separate computer. Network 206 may be a local area network (LAN), a wide area network (WAN), or an inter-network such as the Internet, for example.

Load balancer 204 is also communicatively coupled to servers 208A-N. Each of servers 208A-N may be a separate process executing on a separate computer. For example, each of servers 208A-N may be an identity server that conforms to the Liberty Alliance Project's Liberty Alliance Federation Framework specification.

Servers 208A-N store session state information in, and read session state information from, session tables 210A-N, respectively. Because each of servers 208A-N may process requests pertaining to different sessions, the contents of session tables 210A-N may differ. Session tables 210A-N may be maintained in the memory resources of the computers that execute servers 208A-N, respectively, so that each server can access session state information at relatively high speeds.

Each of servers 208A-N is also communicatively coupled with a database 212. According to one embodiment, all of the session state information in each of session tables 210A-N is also stored in database 212. In one embodiment, whenever session state information is generated or modified in any of session tables 210A-N, the session state information is also modified in database 212.

An example of the operation of the system is described below. According to one embodiment, a user agent, such as user agent 202A, sends, through network 206, a "log-in" request to load balancer 204. Load balancer 204 receives the log-in request and forwards the log-in request to a server, such as server 208A.

In response to receiving the log-in request, server 208A generates a unique session key value. Server 208A stores the session key value in session table 210A. Server 208A assumes the role of primary server for the session associated with the session key value. Thus, a new session is created. Server 208A sends a response to user agent 202A. The response indicates the session key value. The response also indicates that server 208A is the primary server for the session.

User agent 202A receives the response and stores information that indicates that server 208A is the primary server associated with the session key value. For example, the information may be stored in a "cookie." Thereafter, user agent 202A indicates, in each request that pertains to the session, both the identity of the primary server for the session and the session key value.

For example, user agent 202A may send another request, pertaining to the same session, to load balancer 204. Although load balancer 204 should send the request to server 202A because the session state information for the session is stored in session table 210A, load balancer 204 might direct the request to any of servers 208A-N. For example, load balancer 204 might direct the request to server 208B.

Like any of servers 208A-N configured according to one embodiment, when server 208B receives a request that pertains to a pre-existing session (as evidenced by the session key value included in the request), server 208B determines whether session state information associated with the session key value indicated in the request is contained in the local session table; in this case, session table 210B. In this case, server 208B determines that session state information associated with the session key value is not stored in session table 210B.

Because the session key value is not stored in session table 210B, server 208B determines, from the request, the identity of the primary server that is associated with the session. In this case, server 208B determines that the primary server is server 208A.

Server 208B pings server 208A to determine whether server 208A is currently operational. If server 208B receives a timely reply from server 208A, then server 208B determines that server 208A is currently operational. In such a case, server 208B sends the request to server 208A. Server 208A then receives the request, determines that session state information associated with the session key value is stored in session table 210A, and processes the request. In processing the request, server 208A might modify session state information associated with the session key value in session table 210A.

However, if server 208B does not receive a timely reply from server 208A, then server 208B determines that server 208A is not currently operational. In such a case, server 208B processes the session key value through a deterministic mechanism to derive a result value that is the next value in a particular ordering of values. The derivation of the result value is explained below.

A permutation of a set of values expresses an ordering of that set of values. For example, the possible permutations of a set of values (1,2,3) are (1,2,3), (1,3,2), (2,1,3), (2,3,1), (3,1,2), and (3,2,1). For a set of result values, a deterministic mechanism such as a deterministic algorithm may be defined that generates result values from that set, in an order expressed by a particular permutation of the set, every time that the deterministic mechanism is given a particular session key value.

For example, for a set of result values (1,2,3), a deterministic algorithm may be defined that generates result values in the order expressed by the permutation (3,2,1) whenever the deterministic algorithm is given a session key value of "1." The same deterministic algorithm may generate result values in the order expressed by the permutation (2,1,3) whenever the deterministic algorithm is given a session key value of "2." When given different session key values, the same deterministic algorithm may generate result values in orders expressed by different permutations of the same set of result values. An example of such a deterministic algorithm is described further below.

In one embodiment, for each of servers 208A-N, the set of result values comprises a different result value that is associated with that server. For example, server 208A might be associated with result value "1," server 208B might be associated with result value "2," and server 208C might be associated with a result value "3." Although a three-element set is described for purposes of example herein, in one embodiment, the set of result values contains as many different result values as there are servers 208A-N.

Continuing the previous example, in one embodiment, server 202B processes the session key value through a deterministic algorithm as described above to derive the first-ordered result value in a particular permutation of the set of result values. If the session key value is "1," for example, then the first-ordered result value generated by the deterministic algorithm might be "3." If the session key value is "2," for example, then the first-ordered result value generated by the deterministic algorithm might be "2."

Assuming for purposes of example that the session key value is "1" and the first-ordered result value generated by the deterministic algorithm is "3," server 208B determines that the first-ordered result value "3" is associated with server 208C. Server 208B pings server 208C to determine whether server 208C is currently operational. If server 208B receives a timely reply from server 208C, then server 208B determines that server 208C is currently operational. In such a case, server 208B sends the request to server 208C.

Server 208C then receives the request, but determines that the session state information associated with the session key value is not stored in session table 210C. Therefore, in the same manner as server 208B, server 208C determines whether the primary server indicated in the request, server 208A, is currently operational. In response to determining that server 208A is not currently operational, server 208C uses the same deterministic algorithm and session key value ("1") to derive the first-ordered result value of "3" in the same manner as server 208B. In response to determining that "3" is the result value with which server 208C itself is associated, server 208C assumes the role of backup server for the session associated with session key value "1". Server 208C retrieves, from database 212, the session state information associated with session key value "1." Server 208C places the session state information in table 210C and processes the request.

In the above example, server 208B determined that server 208C was currently operational. However, in another example, server 208C might also have failed. In this case, server 208B does not receive a timely reply from server 208C, so server 208B determines that server 208C is not currently operational. In such a case, server 208B processes the session key value through the deterministic algorithm again to derive the second-ordered result value in the particular permutation of the set of result values.

Assuming for purposes of example that the session key value is "1" and that the second-ordered result value derived by the deterministic algorithm is "2," server 208B determines that the second-ordered result value "2" is the result value with which server 208B itself is associated. Consequently, server 208B assumes the role of backup server for the session associated with session key value "1". Server 208B retrieves, from database 212, the session state information associated with session key value "1." Server 208B places the session state information in table 210B and processes the request.

Thus, regardless of which of servers 208A-N receives the request from load balancer 204, each of servers 208A-N follows the same approach in determining to which of server 208A-N the request should be forwarded. In the event that the primary server indicated in the request is not currently operational, each of servers 208A-N uses the same deterministic algorithm in conjunction with the request's indicated session key value to derive the same ordering of potential backup servers for the request's session. Because each of servers 208A-N can derive the same ordering based on the deterministic algorithm and the session key value, the ordering does not need to be indicated in the request itself.

In one embodiment, because the deterministic algorithm produces result values in different orders when given different session key values, backup servers determined for different sessions tend to be different. For example, if the session key value "1" is processed by the deterministic algorithm to derive the result value "3" initially, and the session key value "2" is processed by the deterministic algorithm to derive the result value "2" initially, then, assuming that both servers 208B and 208C are currently operational, server 208C will assume the role of backup server for the session associated with session key "1," and server 208B will assume the role of backup server for the session associated with session key "2." As a result, loads tend to remain balanced among servers 208A-N even when one or more of servers 208A-N fails.

Deterministic Pseudo-Random Number Generation

As discussed above, a deterministic algorithm can be defined that, when given a particular session key value, generates result values in the order expressed by a particular permutation of a set of result values. An example of such a deterministic algorithm is a deterministic pseudo-random number generator.

According to one embodiment, before a server, such as any of servers 208A-N, generates the first result value as discussed above, the server seeds a deterministic pseudo-random number generator with the session key value. For example, in one embodiment, a deterministic pseudo-random number generator object is instantiated and seeded with the session key using the following Java code:

random=new Random( )
random.setSeed(sKey);

In the above example, "random" is assigned an instance of a deterministic pseudo-random number generator class, and the "setSeed" method of the instance is invoked with "sKey" as a parameter. In this example, the "sKey" parameter is the session key value. Thus, the invocation of the "setSeed" method seeds the deterministic pseudo-random number generator object with the session key value.

Once the deterministic pseudo-random number generator ("the generator") has been seeded with the session key value, the generator can be invoked as many times as is needed to generate result values. As a consequence of being seeded with the session key value, the generator generates result values in a particular order.

For example, if the generator is seeded with "1," then the first result value that the generator generates might be "3," the second value that the generator generates might be "2," and the third value that the generator generates might be "1." The following Java code illustrates an example of how the generator object instantiated in the code above can be used to generate a result value in this manner:

int resultValue=random.nextInt(serverList.length)+1;

In the above example, invoking the "nextInt" method of the "random" object with "serverList.length" as a parameter causes a pseudo-random number in the range from zero to one less than the value of "serverList.length," inclusive, to be generated. Thus, "resultValue" is assigned a pseudo-random number in the range from one to the value of "serverList.length," inclusive. The value of "serverList.length" is the number of servers 208A-N. Repeated invocations of the "nextInt" method cause result values to be generated in a particular order derived from the session key value with which the generator was seeded.

Depending upon implementation, the generator may generate duplicate result values. Such duplicate result values may be detected and ignored. Alternatively, duplicate result values may be handled in the same manner as non-duplicate result values. For example, it may be determined, each time that a duplicate result value is generated, whether the server associated with the duplicate result value is currently operational.

Sample Operation

Figure 3A:
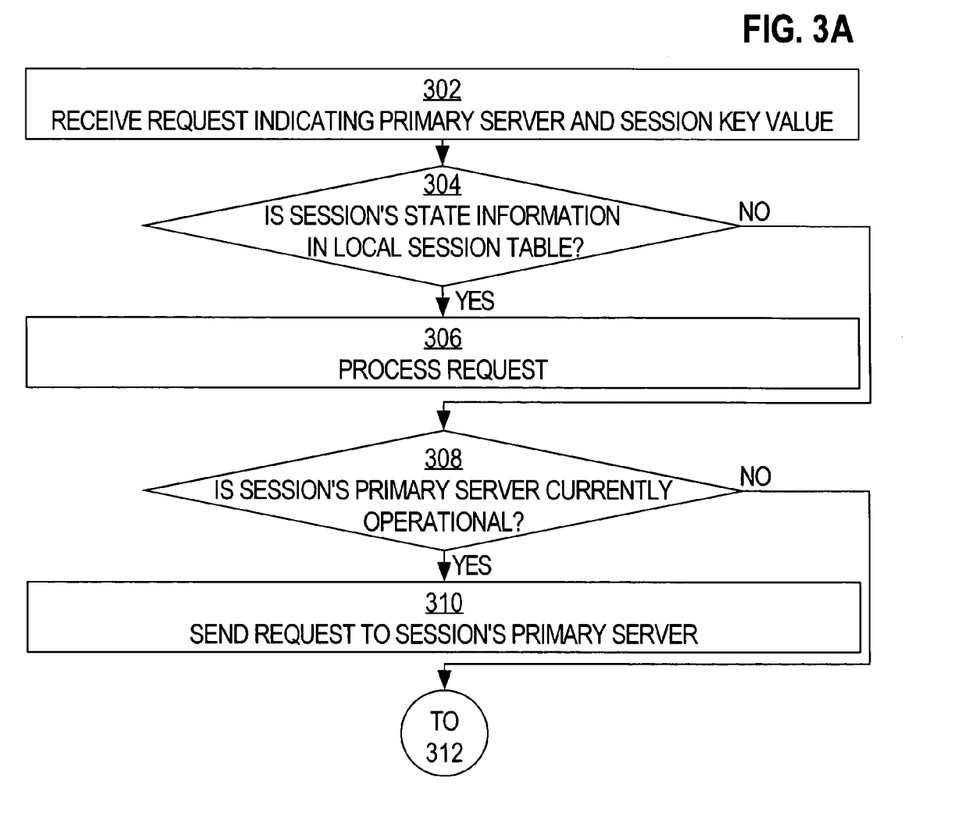
FIGS. 3A and 3B depict a more detailed operational flow for determining, based on a deterministic mechanism and a session's key value, a backup server for the session, in accordance with one embodiment of the present invention.
Figure 3B:
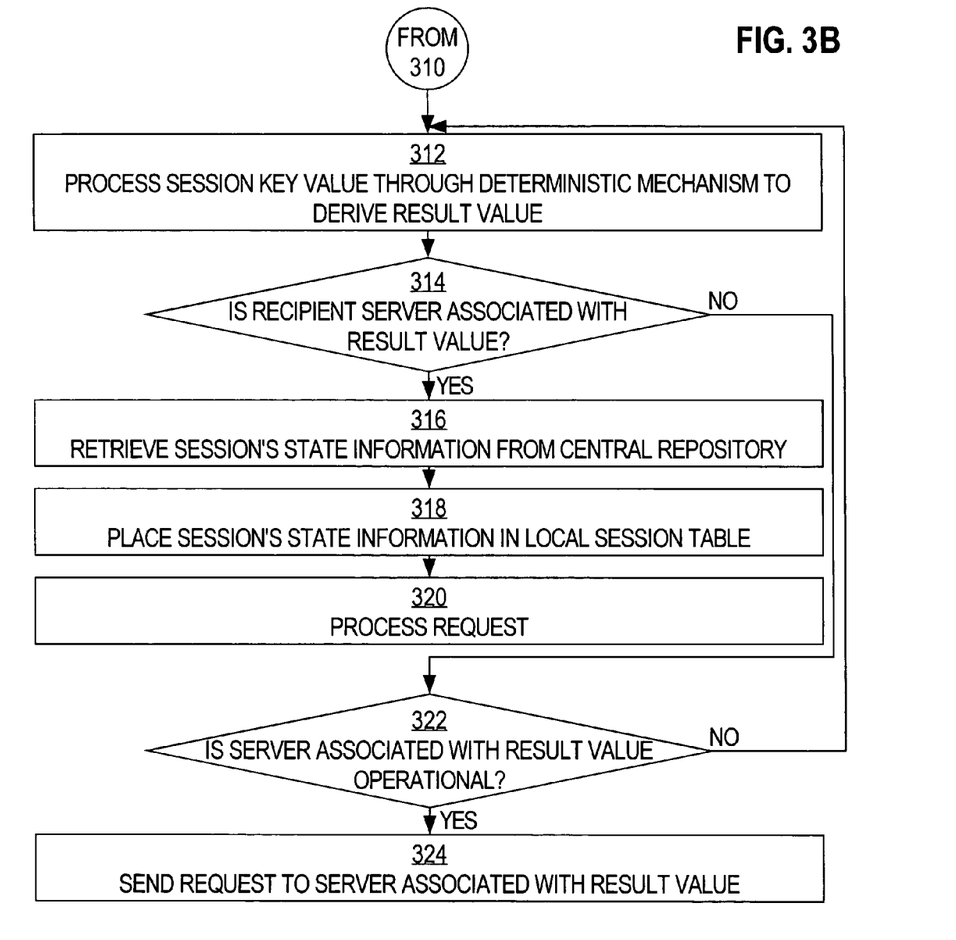

FIGS. 3A and 3B depict a more detailed operational flow for determining, based on a deterministic mechanism and a session's key value, a backup server for the session, in accordance with one embodiment of the present invention. For example, each of servers 208A-N may independently perform the operations depicted.

In block 302, a request is received. The request indicates both a primary server identity and a session key value that is associated with a session to which the request pertains. In block 304, it is determined whether session state information associated with the session key value is contained in a local session table (i.e., the local session table associated with the server performing the operation of block 304). If this session state information is contained in the local session table, then control passes to block 306. Otherwise, control passes to block 308.

In block 306, the request is processed using the session state information contained in the local session table. A response may be generated and returned to the user agent that generated the request. The operational flow ends with regard to the request.

Alternatively, in block 308, it is determined whether a server that is associated with the primary server identity ("the primary server") is currently operational. If the primary server is currently operational, then control passes to block 310. Otherwise, control passes to block 312.

In block 310, the request is sent to the primary server. The primary server may process the request using session state information contained in the primary server's local session table. The operational flow ends with regard to the request.

Alternatively, in block 312, the session key value is processed through a deterministic mechanism to derive a result value. The result value is the next value in a particular ordering of a set of result values. The operation of block 312 may be performed multiple times, depending on the determinations made in blocks 314 and 322 below. Each time that the operation of block 312 is performed, a different result value may be derived. The Nth time that the operation of block 312 is performed, the result value derived in block 312 is the Nth-ordered value in the particular ordering.

In block 314, it is determined whether the server that received the request (i.e., the server performing the operation of block 314) is associated with the result value. If the server that received the request is associated with the result value, then control passes to block 316. Otherwise, control passes to block 322.

In block 316, the session state information associated with the session key value is retrieved from a central repository. The central repository may be database 212, for example. In block 318, the session state information is placed in a local session table. Thus, the server that received the request (i.e., the server performing the operation of block 318) assumes the role of backup server for the session associated with the session key value. In block 320, the request is processed using the session state information contained in the local session table. A response may be generated and returned to the user agent that generated the request. The operational flow ends with regard to the request.

Alternatively, in block 322, it is determined whether a server that is associated with the result value is currently operational. If the server associated with the result value is currently operational, then control passes to block 324. Otherwise, control passes back to block 312, so that the next-ordered result value in the particular ordering of the set of values can be derived.

In block 324, the request is sent to the server associated with the result value. The server associated with the result value may perform the operations described above, beginning with the operation of block 302.

After a server fails, the server may eventually become operational again. According to one embodiment, when a particular server returns to operation, the particular server determines which of the others of servers 202A-N are the backup servers for the particular sessions that indicate the particular server as the primary server. The particular server retrieves the session state information for each of the particular sessions from the session tables that store the session state information. The particular server places the session state information in the particular server's local session table. The session state information for the particular sessions may be removed from the backup servers' local session tables.

Hardware Overview

Figure 4:
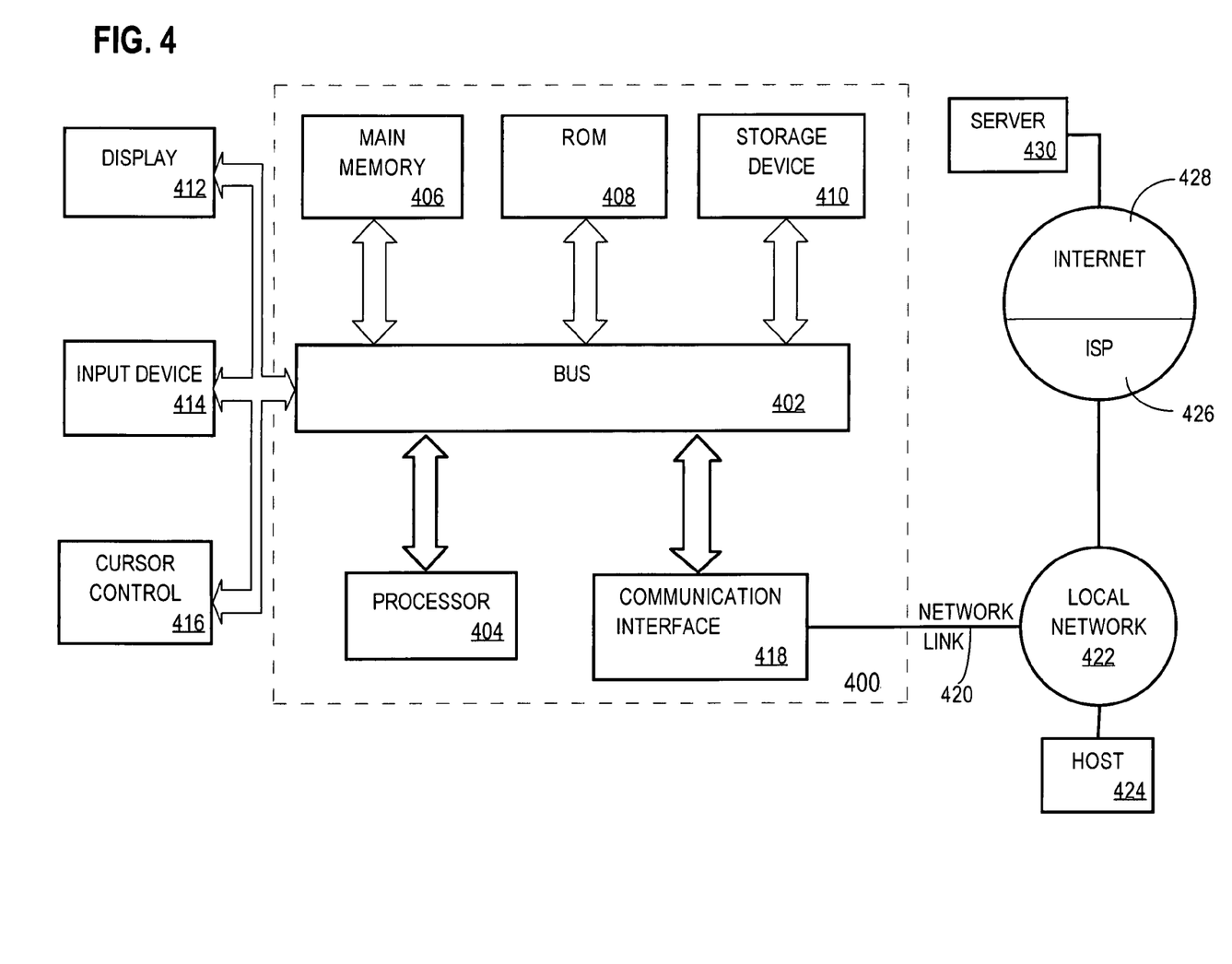
FIG. 4 is a hardware block diagram of a sample computer system, upon which one or more components of an embodiment of the present invention may be implemented.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions. Although the components of computer system 400 are depicted as being within a single chasse, it is contemplated that the components of computer system 400 may be distributed among multiple separate devices that are communicatively coupled via a network.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, data, etc., to be exchanged between the various components. For example, bus 402 may be a set of conductors that carries electrical signals. Bus 402 may further be a network connection that connects one or more of the components. Any mechanism and/or medium that enables information, data, etc., to be exchanged between the various components may be used as bus 402.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and tangible media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 404 for execution. For example, the instructions may be carried on a magnetic disk of a remote computer. Bus 402 may carry the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented.

Network link 420 typically provides data communication through one or more networks to other devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:

receiving, by a first backup server, a first request comprising a first session key value and a first primary server identifier, wherein the first backup server is one of a plurality of servers;

making a first determination, by the first backup server, that the first request is associated with a first primary server based on the first primary server identifier, wherein the first primary server is one of the plurality of servers;

making a second determination, by the first backup server, that the first primary server is not currently operational;

generating, by the first backup server based on the second determination, a first ordering of potential backup servers by applying a deterministic algorithm to the first session key value;

selecting, by the first backup server, a second backup server based on a first-ordered value from the first ordering of potential backup servers, wherein the second backup server is one of the plurality of servers;

sending, by the first backup server based on the selecting, the first request to the second backup server;

receiving, by the second backup server, the first request;

making a third determination, by the second backup server, that the first request is associated with the first primary server based on the first primary server identifier;

making a fourth determination, by the second backup server, that the first primary server is not currently operational;

generating, by the second backup server based on the fourth determination, the first ordering of potential backup servers by applying the deterministic algorithm to the first session key value;

obtaining the first-ordered value from the first ordering of potential backup servers; and processing, by the second backup server, the first request based on a determination that the first-ordered value from the first ordering of potential backup servers is associated with the second backup server.

2. The method of claim 1, further comprising:

receiving, by the first backup server, a second request comprising a second session key value and a second primary server identifier;

making a fifth determination, by the first backup server, that the second request is associated with a second primary server based on the second primary server identifier, wherein the second primary server is one of the plurality of servers;

making a sixth determination, by the first backup server, that the second primary server is not currently operational;

generating, by the first backup server based on the sixth determination, a second ordering of potential backup servers by applying the deterministic algorithm to the second session key value;

obtaining, by the first backup server, a first-ordered value from the second ordering of potential backup servers; and processing, by the first backup server, the second request based on a determination that the first-ordered value from the second ordering of potential backup servers is associated with the first backup server.

3. A non-transitory machine-readable medium, comprising instructions, which when executed by a processor perform a method, the method comprising:

receiving, by a first backup server, a first request comprising a first session key value and a first primary server identifier, wherein the first backup server is one of a plurality of servers;

making a first determination, by the first backup server, that the first request is associated with a first primary server based on the first primary server identifier, wherein the first primary server is one of the plurality of servers;

making a second determination, by the first backup server, that the first primary server is not currently operational;

generating, by the first backup server based on the second determination, a first ordering of potential backup servers by applying a deterministic algorithm to the first session key value;

selecting, by the first backup server, a second backup server based on a first-ordered value from the first ordering of potential backup servers, wherein the second backup server is one of the plurality of servers;

sending, by the first backup server based on the selecting, the first request to the second backup server;

receiving, by the second backup server, the first request;

making a third determination, by the second backup server, that the first request is associated with the first primary server based on the first primary server identifier;

making a fourth determination, by the second backup server, that the first primary server is not currently operational;

generating, by the second backup server based on the fourth determination, the first ordering of potential backup servers by applying the deterministic algorithm to the first session key value;

obtaining, the first-ordered value from the first ordering of potential backup servers; and processing, by the second backup server, the first request based on a determination that the first-ordered value is associated with the second backup server.

4. The non-transitory machine-readable medium of claim 3, the method further comprising:

receiving, by the first backup server, a second request comprising a second session key value and a second primary server identifier;

making a fifth determination, by the first backup server, that the second request is associated with a second primary server based on the second primary server identifier, wherein the second primary server is one of the plurality of servers;

making a sixth determination, by the first backup server, that the second primary server is not currently operational;

generating, by the first backup server, a second ordering of potential backup servers by applying the deterministic algorithm to the second session key value;

obtaining, by the first backup server, a first-ordered value from the second ordering of potential backup servers; and processing, by the first backup server, the second request based on a determination that the first-ordered value from the second ordering of potential backup servers is associated with the first backup server.

5. An apparatus comprising:

a first backup server configured to:
  receive a first request comprising a first session key value and a first primary server identifier;
  make a first determination that the first request is associated with a first primary server based on the first primary server identifier, wherein the first primary server is one of a plurality of servers;
  make a second determination that the first primary server is not currently operational;
  generate a first ordering of potential backup servers by applying a deterministic algorithm to the first session key value;
  select a second backup server based on a first-ordered value from the first ordering of potential backup servers;
  send the first request to the second backup server;

the second backup server configured to:
  receive the first request;
  make a third determination that the first request is associated with the first primary server based on the first primary server identifier;
  make a fourth determination that the first primary server is not currently operational;
  generate, based on the fourth determination, the first ordering of potential backup servers by applying the deterministic algorithm to the first session key value;
  obtain the first-ordered value from the first ordering of potential backup servers; and
  process the first request based on a determination that the first-ordered value is associated with the second backup server.

6. The apparatus of claim 5, wherein the first backup server is further configured to:

receive a second request comprising a second session key value and a second primary server identifier;

make a fifth determination that the second request is associated with a second primary server based on the second primary server identifier, wherein the second primary server is one of the plurality of servers;
make a sixth determination that the second primary server is not currently operational; based on the determination that the second primary server is not currently operational: obtain the set of values; seed the deterministic pseudo-random number generator with the second session key value;
generate, based on the sixth determination, a second ordering of potential backup servers by applying the deterministic algorithm to the second session key value;
obtain a first-ordered value from the second ordering of potential backup servers; and
process the second request based on a determination that the first-ordered value from the second ordering of potential backup servers is associated with the first backup server.

7. The method of claim 1, wherein the first primary server is a third backup server.

8. The method of claim 1, wherein making the first determination comprises:
making a third determination, by the first backup server, that session state information associated with the first session key value is not stored in a session table on the first backup server.

9. The method of claim 1, further comprising:
receiving, by the first backup server, a second request comprising a second session key value and a second primary server identifier;
making a fifth determination, by the first backup server, that the second request is associated with a second primary server based on the second primary server identifier, wherein the second primary server is one of the plurality of servers;
making a sixth determination, by the first backup server, that the second backup server is operational; and
sending the second request to the second backup server based on the sixth determination.

10. The non-transitory machine-readable medium of claim 3, wherein the first primary server is a third backup server.

11. The non-transitory machine-readable medium of claim 3, wherein making the first determination a first comprises:
making a third determination, by the first backup server, that session state information associated with the first session key value is not stored in a session table on the first backup server.

12. The non-transitory machine-readable medium of claim 3, the method further comprising:
receiving, by the first backup server, a second request comprising a second session key value and a second primary server identifier;
making a fifth determination, by the first backup server, that the second request is associated with a second primary server based on the second primary server identifier, wherein the second primary server is one of the plurality of servers;
making a sixth determination, by the first backup server, that the second backup server is operational; and
sending the second request to the second backup server based on the sixth determination.

13. The apparatus of claim 5, wherein the first primary server is a third backup server.

14. The apparatus of claim 5, wherein making the first determination comprises:
making a third determination, by the first backup server, that session state information associated with the first session key value is not stored in a session table on the first backup server.

15. The apparatus of claim 5, wherein the first backup server is further configured to:
receive a second request comprising a second session key value and a second primary server identifier;
make a fifth determination, by the first backup server, that the second request is associated with a second primary server based on the second primary server identifier, wherein the second primary server is one of the plurality of servers;
make a sixth determination, that the second backup server is operational; and send the second request to the second backup server based on the sixth determination.

* * * * *